United States Patent Office 3,451,955
Patented June 24, 1969

3,451,955
COATING COMPOSITION COMPRISING A BLEND OF THE REACTION PRODUCT OF A HIGHLY METHYLATED HEXAMETHYLOL MELAMINE WITH A FREE HYDROXYL GROUP CONTAINING COPOLYMER BLENDED WITH A GLYCERIDE OIL MODIFIED ALKYD RESIN OR CERTAIN ACRYLIC TERPOLYMERS
Jerry Norman Koral, Stamford, and John Christos Petropoulos, Norwalk, Conn., assignors to American Cyanamid Company, Stamford, Conn., a corporation of Maine
No Drawing. Filed Aug. 1, 1966, Ser. No. 569,098
Int. Cl. C09d 3/76, 3/66
U.S. Cl. 260—21         10 Claims

ABSTRACT OF THE DISCLOSURE

A composition of matter comprising a blend of the reaction product of a highly methylated hexamethylol melamine and a copolymer of a monovinyl aromatic monomer having pendant free hydroxyl groups and a resinous material such as a glyceride oil modified alkyl resin or certain acrylic terpolymeric materials.

---

This invention relates to a composition of matter comprising a blend of (1) from about 10% to about 50%, by weight of the reaction product of (a) from 70% to 90% of a highly methylated hexamethylol melamine having an average degree of methylolation of at least 5.75 and an average degree of methylation of at least 4.80 and (b) correspondingly from 30% to 10% of a free hydroxyl group containing copolymer of a monovinyl aromatic monomer and a monomer having the formula:

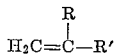

wherein R is a member selected from the group consisting of hydrogen, halogen, an alkyl group containing from 1 to 4 carbon atoms and an aryl group, and wherein R' is a hydroxy alkyl group containing from 1 to 4 carbon atoms and (2) correspondingly from about 90% to about 50%, by weight, of an organic solvent soluble resinous material selected from the group consisting of an oil modified alkyd resin and an acrylic terpolymeric material, wherein the percentages of the components in the respective categories each separately total 100%.

Still further, this invention relates to coating compositions using the resinous blend of the present invention dissolved in a solvent for the blend, which solvent is substantially inert to any of the resinous reactants under the conditions of use.

One of the objects of the present invention is to produce a polymeric composition of matter which can be used particularly as a coating composition. A further object of the present invention is to produce a coating composition of the class described which displays faster cure at lower temperatures, better catalyzed viscosity stability, lower solids comparable viscosity and a lesser tendency to develop cratering when used as a coating composition. These and other objects of the present invention will be discussed in greater detail hereinbelow.

The first component used in the composition of the present invention is the reaction product of a highly methylated hexamethylolmelamine having an average degree of methylolation of at least 5.75 and an average degree of methylation of at least 4.80 with a free hydroxyl group containing copolymer of a monovinyl aromatic monomer and a monomer having the formula:

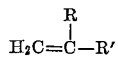

wherein R is a member selected from the group consisting of hydrogen, halogen, an alkyl group containing from 1 to 4 carbon atoms and an aryl group, and wherein R' is a hydroxy alkyl group containing from 1 to 4 carbon atoms. The amount of the melamine compound used may be varied between about 70% and 90%, by weight, while the copolymer is present correspondingly from about 30% to 10%, by weight, based on the total weight of the melamine compound and the free hydroxyl group containing copolymer. Preferably, one would use between about 75% and 85%, by weight, of the melamine compound and correspondingly from about 25% to about 15%, by weight, of the hydroxyl group containing copolymer. For optimum results, one would use about 80% of the melamine compound and correspondingly about 20% of the free hydroxyl group containing copolymer. When reference is made to the melamine compound, it is intended to encompass blends of melamine compounds of the class described as well and this aspect of the invention will be elaborated on in detail hereinbelow.

The highly methylated hexamethylolmelamine compounds used in the present invention will have an average degree of methylolation of at least 5.75 and an average degree of methylation of at least 4.80. These methylated methylol melamine compounds are not resinous materials since they are, as individual entities, pure compounds, but they are potential resin-forming compounds which enter into chemical reaction with certain resinous materials when subjected to heat. Theoretically, at least, it is possible to methylolate melamine fully, that is, to produce hexamethylol melamine. However, frequently, a composition purporting to be hexamethylol melamine, when analyzed, shows what appears to be a fractional or average degree of methylolation. It is well recognized that fractional methylolation is not considered to be possible. As a consequence, when a composition containing on analysis a degree of methylolation of 5.75, 5.80, or even 5.90, or higher, it has to be recognized that this is but an average degree of methylolation of the melamine compound and establishes logically that the aforementioned methylol composition is composed of a mixture of a preponderant amount of hexamethylol melamine with comparatively minor amounts of pentamethylol melamine and perhaps insignificant amounts, including traces, of such derivatives as tetramethylol melamine and even trimethylol melamine. The same concept of averages is also applicable to the alkylation or, more specifically, the methylation of the hexamethylol melamine composition. There cannot be, based on present reasoning, a fractional degree of methylation and, as a consequence, when on analysis a given composition shows that the degree of methylation is 4.80 or 5.15 or 5.25 or even as high as 5.90, or higher, it must be presumed that there exists in the total composition a mixture of hexamethyl ethers of hexamethylol melamines and pentamethyl ethers of hexamethylol melamines and perhaps minor inconsequential amounts of tetramethyl ethers of pentamethylol melamine and hexamethylol melamine and perhaps even trimethyl ethers of these polymethylol melamines. The methyl ethers of the hexamethylol melamine in the starting composition will be preponderantly pentamethyl ethers and hexamethyl ethers.

The free hydroxyl group containing copolymer which is reacted with the melamine compounds is prepared by polymerizing a monovinyl aromatic monomer with the monomer having the formula:

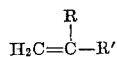

wherein R is a member selected from the group consisting of hydrogen, halogen, an alkyl group containing from 1 to 4 carbon atoms and an aryl group, and wherein R' is a hydroxy alkyl group containing from 1 to 4 carbon atoms.

These hydroxy group copolymers and means for their preparation are set forth in U.S. Patent 2,940,946 to Shokal et al. which disclosure in the interest of brevity is incorporated by reference herein.

We have found to be very suitable for our invention commercially available styrene-allyl alcohol copolymers which contain about 75 parts, by weight, of styrene and 25 parts, by weight, of allyl alcohol, said copolymer having a molecular weight of approximately 1150 to 1600, as measured by viscosity index.

Among the vinyl aromatic monomers which can be employed in preparing the free hydroxyl-containing copolymer are styrene per se, side chain substituted styrenes as $\alpha$-methyl styrene, $\alpha$-ethyl styrene, and the like, ring substituted styrenes such as alkyl styrenes, e.g., o-, m-, p-methyl styrenes, o-, m-, p-ethyl styrenes and p-propyl styrene, dialkyl styrenes, e.g., 2,4-dimethyl styrene and 2,5-diethyl styrene, halostyrenes, e.g., o-bromo-styrene, p-chlorostyrene, 2,4-dichlorostyrene and 2,5-dibromostyrene, and vinyl naphthalene, e.g., $\beta$-vinyl naphthalene, and the like, as well as mixtures thereof. Styrene, due to its availability and low cost, is the preferred vinyl aromatic monomer.

A wide variety of hydroxyl-containing vinyl monomers may be employed in preparing the free hydroxyl containing copolymer. However, an especially preferred class of hydroxyl containing vinyl monomers encompasses those compounds represented by the general formula:

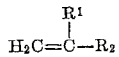

wherein $R^1$ represents a hydrogen atom, a halogen atom, i.e., fluorine, chlorine, bromine or iodine, an alkyl group having from 1 to 4 carbon atoms, inclusive, e.g., methyl, ethyl, n-propyl, n-butyl, and the like, or an aryl group, e.g., a phenyl group, and $R_2$ represents a hydroxyalkyl group, preferably a primary hydroxyalkyl group, having from 1 to 4 carbon atoms, inclusive, e.g., hydroxymethyl, 2-hydroxyethyl, 3-hydroxypropyl, 4-hydroxybutyl, and the like.

Among the hydroxyl containing vinyl monomers coming within the scope of the general formula given above which may be used in the composition of the present invention are allyl alcohol, $\beta$-bromoallyl alcohol, $\beta$-chloroallyl alcohol, methallyl alcohol, $\beta$-phenylallyl alcohol, 3-buten-1-ol, 3-buten-2-ol, 4-penten-1-ol, 4-penten-2-ol, and the like, as well as mixtures thereof. Of these monomers, allyl alcohol per se is preferred.

The molecular weight range of these copolymers may be varied between about 1,000 and 3,000 as measured by viscosity index and their equivalent weights (molecular weight divided by the number of hydroxyl groups) should be between about 200 and 400, and, preferably, about 300. The lower the hydroxyl number in the copolymer, the more copolymer you are required to use in the reaction with the substituted melamine compounds. Reciprocally, the higher the hydroxyl number of the copolymer the less copolymer you need to react with the substituted melamine compounds.

Although the reaction between the melamine compounds and the hydroxyl containing copolymer may be reacted in bulk, i.e., without any diluent or solvent, it is actually preferred that a solvent be used in carrying out the reaction wherein such inert solvents as the aromatic compounds, such as xylene, toluene, and benzene, can be used. Preferably, the reaction is carried out at about 70% solids for ease of viscosity control and speed of the reaction. However, the coreaction can be carried out at either a higher or lower solid, depending on the individual choice. In carrying out the coreaction between the substituted melamine compound and the hydroxyl group containing copolymer, one may make use of any one of a large group of acid catalysts such as phosphoric acid, maleic, oxalic, phthalic anhydride, para-toluene sulfonic acid, and the like. Oxalic and phthalic acids are preferred for this reaction because of the speed of the reaction, the color of the final resinous component and the lack of haze in the final product. The concentration of the acid catalyst used in carrying out this reaction may be varied between about 0.4% and 5%, by weight, based on the weight of the substituted melamine compounds contained in the charge. The preferred catalyst range is between about 0.7% and 1.2%, by weight, same basis. The reaction between the substituted melamine compounds and the hydroxyl group containing copolymer may be carried out by heating the mixture to a final temperature of from about 120° C. to 150° C. over a period of between about 4 hours and 8 hours.

The reaction product thus produced provides an excellent cross-linking agent for use in comparatively small amounts with a resinous or polymeric material selected from the group consisting of a glyceride oil modified alkyd resin or an acrylic polymeric material. These cross-linking agents provide a faster cure of the total composition at lower temperatures, especially at temperatures below about 150° F.

This characteristic of the compositions of the present invention is particularly important in the field of wood and paper coatings where high temperature cures cannot be used because of the danger of charring and/or drying out of the substrate. This concept will be illustrated in greater detail hereinbelow.

A further advantage to be found in using the cross-linking agent of the present invention using either a glyceride oil modified alkyd resin or using an acrylic polymer composition resides in the fact that the enamel solids-viscosity relationship is much more favorable than in many other systems. This means that higher viscosity formulations can be prepared at lower solids compared with related but excluded compositions. Further details on this aspect of the invention will be set forth hereinbelow.

A still further advantage of the compositions of the present invention resides in the utilization of a higher viscosity component which tends to minimize the cratering tendency in analogous compositions. This, too, will be shown in greater detail hereinbelow.

The second principal component in the composition of the present invention and which is blended with the melamine compound-polyol reaction product is a resinous material selected from the group consisting of an oil modified alkyd resin and an acrylic terpolymer. The amount of alkyd resin or terpolymer which is present in the system is between about 90% and 50%, by weight, based on the total solids in the system and, preferably, between about 85% and 60%. A discussion of the glyceride oil modified alkyd resins in depth is not considered to be necessary since the glyceride oil modified alkyd resin art is very highly developed, and a substantial plurality of these alkyd resins are available commercially in a wide range of varieties. Let it be sufficient to say that the oil-containing alkyds, generally speaking, are made from three reactants: (1) a polycarboxylic acid free from nonbenzenoid unsaturation or its anhydride, (2) polyhydric alcohol, and (3) a glyceride oil, either non-drying, semi-drying, drying or the fatty acids derived therefrom or their monoglycerides.

The polycarboxylic acid free of non-benzenoid unsaturation is present in preponderant amounts, sometimes to the complete exclusion of any unsaturated polycarboxylic acids, such as those that are not free from any non-benzenoid saturation. The alpha-beta ethylenically unsaturated polycarboxylic acids may be used in relatively small amounts, generally in amounts not exceeding about 10%, by weight, based on the total weight of polycarboxylic acids used.

Among the polycarboxylic acids free of non-benzenoid unsaturation that may be used are phthalic, oxalic, malonic, succinic, glutaric, sebacic, adipic, pimelic, suberic, azelaic, tricarballylic, citric, tartaric, malic, and the like. Whenever available, the anhydrides may be used. Furthermore, mixtures of these acids and/or their anhydrides may be used.

Among the polyhydric alcohols which may be used are ethylene glycol, diethylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, alkane diols, propylene glycol, dipropylene glycol, and the like. These polyhydric alcohols may be used alone or in admixture with each other.

Oils suitable for use in formulating oil-containing alkyds include coconut oil, cottonseed, soybean, linseed, perilla, castor, raw or dehydrated, babassu, murumuru, tallow-beef, mustard seed, rape seed, peanut, sesame, sunflower, walnut, tung, oiticia, whale, menhaden, sardine, and the like. These oils may be used alone or in admixture with each other.

In addition to or in the place of any of the oils set forth here and above, one may use the fatty acids which can be derived from these glyceride oils such acids as caproic, caprylic, capric, lauric, lauristic, palmitic, stearic, arachidic, behenic, lignoceric, myristoleic, palmitoleic, oleic, linoleic, linolenic, elaeostearic, licanic, ricinoleic, erucic acids and the like. Frequently these fatty acids will be used in mixture with one another inasmuch as the fatty acids derived from these glyceride oils are mixtures of fatty acids. The fatty acids that are derived from tall oil may also be used and in fact for certain purposes are preferred. For processing purposes it is sometimes advantageous to use the monoglycerides of these fatty acids. The glyceride oils, the fatty acids derived therefrom and/or the monoglycerides of said fatty acids may be used in combination with one another if desired.

In place of the oil modified alkyd resin used in the concept of the present invention, one may substitute an organic solvent soluble acrylic terpolymer material. In this acrylic terpolymer material, there are three principal and essential components, each of which will be discussed in greater detail hereinbelow. The first component identified as Component (A) is described generically as a polymerizable monomer which is capable of imparting a hardness to the ultimate terpolymer material as used. This polymerizable class of monomers may be any one of the vinyl aromatic compounds such as styrene per se, side-chain substituted alkyl styrenes such as α-methyl styrene, α-ethyl styrene, and the like, ring substituted alkyl styrenes, such as o-methyl styrene, m-ethyl styrene and p-propyl styrene, dialkyl styrenes, such as 2,4-dimethyl styrene and 2,5-diethyl styrene, halostyrenes, such as o-bromostyrene, p-chlorostyrene, 2,4-dichlorostyrene and 2,5-dibromostyrene, and vinyl naphthalene, e.g., β-vinyl naphthalene, and the like, as well as mixtures thereof. Styrene, due to its availability and low cost, is the preferred vinyl aromatic monomer.

In conjunction with the vinyl aromatic monomer or separately, as Component (A), one may use an alkyl ester of methacrylic acid wherein the alkyl portion of the ester contains from one to three carbon atoms. More specifically, one can use methyl methacrylate, ethyl methacrylate, and/or propyl methacrylate.

The second component of the organic solvent soluble acrylic terpolymer material is identified as a softening monomer and is identified for sake of simplicity as Component (B). More specifically, the softening monomer is an alkyl ester of acrylic acid in which the alkyl esters contain in the alkyl portion between one and eight carbon atoms inclusive. More specifically, the softening monomer can be methyl acrylate, ethyl acrylate, propyl acrylates, butyl acrylates, amyl acrylates, hexyl acrylates, heptyl acrylates, and octyl acrylates.

The third component in the organic solvent soluble acrylic terpolymer material is identified as Component (C), a hydroxy-containing ester of acrylic or methacrylic acid. These hydroxy-containing esters are prepared by reacting a polyhydric alcohol and preferably a diol with either acrylic or methacrylic acid or they may be prepared by the reaction of ethylene or propylene oxide with the respective acids. Illustrative of the type of compounds that can be used as the Component (C) are β-hydroxyethylacrylate, β-hydroxyethyl methacrylate, β-hydroxypropylacrylate, α-hydroxypropyl methacrylate, α-hydroxybutyl methacrylate, and the like, as well as mixtures thereof.

These hydroxyl-containing vinyl monomers, as well as methods for their preparation, are well-known in the art. Thus, for example, one method for the preparation of the above-described hydroxyalkyl acrylates and hydroxy alkyl methacrylates involves reacting acrylic acid or the appropriate substituted acrylic acid, or a suitable ester thereof, with an alkane diol. Another method involves the reaction of acrylic acid or the appropriate substituted acrylic acid with a lower alkylene oxide, such as ethylene oxide, propylene oxide, and the like.

The organic solvent soluble acrylic pure polymer material should have a hydroxy number between about 50 and 250, and preferably between about 80 and 150. This hydroxyl number limitation will establish the amounts of the Component (C) that will be present in the acrylic terpolymer. The amount of (A) to (B) may be shown between about 1:2 and 2:1, respectively. Any one skilled in the art having selected the particular hydroxyl number desired in his acrylic terpolymer can then readily calculate how much of each of Components (A) and (B) are required in order to produce the acrylic polymer to be used in the composition of the present invention. These acrylic terpolymers are not only organic solvent soluble but are preferably prepared in an organic solvent.

In order that the concept of the present invention may be more fully understood, the following examples are set forth in which all parts are parts by weight unless otherwise indicated. These examples are set forth primarily for the purpose of illustration and any specific enumeration of details contained therein should not be interpreted as limitation on the case except as indicated by the appended claims. The first example is set forth in a plurality of parts in order to illustrate first the preparation of the reaction product of the hexakis(methoxymethyl)melamine with the hydroxyl group containing copolymer. This part of Example 1 is identified for the sake of simplicity as Adduct A.

EXAMPLE 1

Adduct A

In a suitable reaction vessel equipped with theromometer, stirrer, and reflux condenser, there is introduced 600 parts of hexakis(methoxymethyl)melamine and 150 parts of a commercially available styrene-allyl alcohol copolymer which contains about 75 parts by weight of styrene and about 25 parts by weight of allyl alcohol and has a molecular weight of about 1600. The reaction mixture is then heated to about 123° C. and a clear solution is obtained. The reaction mixture is then cooled to 50° C. and 24 parts of an acid catalyst solution (25% oxalic acid in methanol) is added. The reaction mixture is then heated to 125° C. over a period of 45 minutes during which time the distillate that formed is collected. A large increase in viscosity is observed. The reaction mixture is then cut to about 80% solids in xylene and has a viscosity of $Z_1$ on the Gardner-Holdt scale. For comparative purposes, an 80% solution of hexakis(methoxymethyl)melamine in xylene had a viscosity of —A on the Gardner-Holdt scale.

Part B

A clear room temperature curing finish is prepared by blending a glyceride oil modified alkyd with Adduct A. A commercially available oil modified alkyd, prepared from a mixture of coconut fatty acids, tall oil fatty acids, phthalic anhydride, fumaric acid and glycerol, is used. The oil modified alkyd resin is cut to 50% solids in xylene and two compositions are prepared, one using Adduct A and the other using hexakismethoxymethyl melamine.

| Component | Parts (by weight) | |
| --- | --- | --- |
| Alkyd (50% solids) | 35.8 | 35.8 |
| Hexakis (methoxymethyl) melamine | 11.9 | |
| Adduct A (solids) | | 11.9 |
| Xylene | 33.3 | 33.3 |
| Ethanol | 3.3 | 3.3 |
| VM & P Naphtha | 15.2 | 15.2 |
| Catalysts, Phosphorous trichloride | 0.54 | 0.54 |

The catalyzed hexakis(methoxymethyl)melamine formulation gelled in three days at room temperature whereas the formulation based on the Adduct A component did not gel after 11 days of aging at room temperature. This clearly establishes the advantageous stability of the coating compositions of the present invention.

EXAMPLE 2

A conventional white baking enamel is prepared using commercially available alkyd resin described in Example 1 in combination with Adduct A. The formulation had a pigment (TiO₂) binder ratio of 90/100, alkyd solids/amino component of 85/15 respectively and 0.2% p-toluenesulphonic acid catalyst based on the non-volatiles, and a solvent blend of 85/15 xylene/butanol. A separate formulation is prepared in exactly the same manner as above except that in the place of the Adduct A there is substituted an equivalent amount of hexakis(methoxymethyl)melamine. The latter based formulation had an enamel solids of 68.0% and a viscosity of 58 seconds (Ford No. 4 cup) at 25° C. whereas the formulation containing the Adduct A had a solids content of 66.5% at a viscosity of 58 seconds (Ford No. 4 cup) at 25° C. Still further, the hexakis(methoxymethyl)melamine based formulation gelled in eight days at 55° C. where as the Adduct A based formulation was still fluid after 11 days at 55° C. Furthermore, films prepared from the hexakis(methoxymethyl)melamine based formulation when drawn down on a glass plate and cured had a significant number of craters while the film prepared from the Adduct A based formulation resulted in films with no craters.

EXAMPLE 3

A clear wood finish is formulated from a mixture of a commercially available oil modified alkyd resin prepared from a mixture of tall oil fatty acids, phthalic anhydride, ethylene glycol, and dipentaerythritol, blended with Adduct A. The alkyd amino solids are adjusted to about 70/30 ratio by weight and 3% of p-toluenesulfonic acid based on the melamine compound is added as a catalyst. Two films were cast and baked separately on two pieces of glass and the baking conditions were as follows: One was baked at 175° F. for 10 minutes and the other at 125° F. for 1 hour. The respective Sward hardness readings obtained were 48 and 34. Both these films also exhibited excellent solvent resistance based on a conventional xylene rub test.

COMPARATIVE EXAMPLE 4

A clear wood finish is formulated from a mixture of the oil modified alkyd resin described in Example 3 and hexakis(methoxymethyl)melamine. The alkyd to amino solids was again adjusted to 70/30 ratio by weight as in Example 3 and 3% by weight of p-toluenesulfonic acid is added based on the amino compound. As before two separate films were cast on wood, one being baked at 175° F. for 10 minutes and the other at 125° F. for 1 hour. The respective Sward hardness readings obtained were 30 and 6. Both of these films exhibited very poor solvent resistance based in the same xylene rub test.

EXAMPLE 5

An acrylic terpolymer having the composition of styrene/butyl acrylate/hydroxypropyl methacrylate equal to the following proportions: 49/29/22 percent by weight respectively and having a hydroxyl number of 90 is prepared at a 50% solids in a 1/1, xylene/Cellosolve acetate solvent blend. A clear coating formulation was prepared at 85/15 acrylic resin solids/Adduct A and 3% p-toluenesulfonic acid based on the amino content is used as the catalyst. A film is cast on a glass plate and baked at 125° F. for one hour and showed a Sward hardness after the baking of 50. The solvent resistance of the film is very good based on the same xylene rub test.

COMPARATIVE EXAMPLE 6

Example 5 is repeated in all details except that in place of the Adduct A there is substituted on equivalent amount of hexakis(methoxymethyl)melamine. Films were cast and baked at 125° F. for one hour and a Sward hardness of 34 is obtained. The solvent resistance of the films is poor based on the same xylene rub test.

EXAMPLE 7

A coating composition analogous to that in Example 5 is prepared except that the acrylic terpolymer composition was prepared by using methyl methacrylate/ethyl acrylate/hydroxyethyl acrylate in weight proportions of 36/35/29, respectively. This terpolymer composition has a hydroxyl number of 140. The terpolymer is prepared in a 1/1 mixture of xylene and Cellosolve acetate. A clear coating formulation is prepared by blending 85 parts of this acrylate composition with 15 parts of Adduct A as described in the first part of Example 1. Three percent of p-toluenesulfonic acid is used as the catalyst for the formulation. Films were cast on glass plates and baked at 125° F. for one hour. The films had a Sward hardness of 55. Still further, the films also exhibited very good solvent resistance as evidenced by conventional xylene rub test.

COMPARATIVE EXAMPLE 8

A coating composition analogous to that prepared in Example 7 is formulated except that in the place of Adduct A there is used an equivalent amount of hexakis(methoxymethyl)melamine. The formulation contained 85 parts of the acrylic resin solids and 15 parts of the hexakis(methoxymethyl)melamine with 3% p-toluenesulfonic acid as the catalyst. Films were cast on glass plates and baked at 125° F. for one hour. The films had a Sward hardness of 36. Still further, the films exhibited poor solvent resistance as evidenced by conventional xylene rub test.

It has been indicated hereinabove that the free hydroxyl group containing copolymer of the vinyl aromatic monomer and the monomer having the formula:

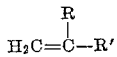

wherein R is a member selected from the group consisting of hydrogen, halogen, an alkyl group containing from 1 to 4 carbon atoms and an aryl group, and wherein R' is a hydroxy alkyl group containing from 1 to 4 carbon atoms available commercially as a styrene allyl alcohol copolymer containing 75 parts, by weight, of styrene and 25 parts, by weight, of allyl alcohol. Other copolymers of these monomers may also be used such as those containing from 50 to 90 parts, by weight, of the vinyl aromatic monomer and, correspondingly, from 50 to about 10 parts, by weight, of the hydroxyl containing monomer. Preferably, one would use between about 70 and 80 parts, by weight, of the vinyl aromatic monomer and, correspondingly, from about 30 to about 20 parts, by weight, of the hydroxyl containing monomer.

We claim:
1. A composition of matter comprising a blend of (1) from about 10% to about 50%, by weight, of the reaction product of (a) from 70% to 90% of a highly methylated hexamethylol melamine having an average degree of methylolation of at least 5.75 and an average degree of methylation of at least 4.80 and (b) correspondingly from 30% to 10% of a free hydroxyl group containing copolymer of a monovinyl aromatic monomer and a monomer having the formula:

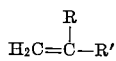

wherein R is a member selected from the group consisting of hydrogen, halogen, an alkyl group containing from 1 to 4 carbon atoms and an aryl group, and wherein R' is a hydroxy alkyl group containing from 1 to 4 carbon atoms and (2) correspondingly from about 90% to about 50%, by weight, of an organic solvent soluble resinous material selected from the group consisting of a glyceride oil modified alkyd resin and an acrylic terpolymeric material, prepared by polymerizing (A) a polymerizable monomer which is capable of imparting a hardness of the ultimate terpolymeric material (B) a softening acrylic monomer and (C) a hydroxy-containing ester of an acrylic acid, said acrylic terpolymer having a hydroxy number between about 50 and 250 and the amount of (A) to (B) in the terpolymer being between about 1:2 and 2:1 respectively, wherein the percentages of the components in the respective categories each separately total 100%.

2. The composition according to claim 1 in which the component (a) is hexakismethoxymethylmelamine.

3. The composition according to claim 1 in which the component (b) is an allyl alcohol-styrene copolymer.

4. The composition according to claim 2 in which the component (b) is an allyl alcohol-styrene copolymer.

5. The composition according to claim 1 in which the component (1) is present in an amount varying between about 15% and 40% and component (2) is correspondingly present in an amount varying between 85% and 60%.

6. The composition according to claim 1 in which the component (a) is present in an amount varying between about 75% and 85% and the component (b) is present correspondingly between about 25% and 15%.

7. The composition according to claim 5 in which the component (a) is present in an amount varying between about 75% and 85% and the component (b) is present correspondingly between about 25% and 15%.

8. The composition according to claim 5 in which the component (b) is an allyl alcohol-styrene copolymer.

9. The composition according to claim 6 in which the component (b) is an allyl alcohol-styrene copolymer.

10. The composition according to claim 7 in which the component (b) is an allyl alcohol-styrene copolymer.

References Cited

UNITED STATES PATENTS

| 2,852,476 | 9/1958 | Cummings | 260—21 |
| 2,897,174 | 7/1959 | Chapin et al. | 260—855 |
| 2,962,460 | 11/1960 | Chapin et al. | 260—21 |
| 3,069,368 | 12/1962 | Carney et al. | 260—855 |
| 3,082,184 | 3/1963 | Falgiatore et al. | 260—855 |
| 3,211,579 | 10/1965 | Reiter | 260—855 |
| 3,218,280 | 11/1965 | Koral et al. | 260—855 |

FOREIGN PATENTS 673,517  11/1963  Canada.

H. E. TAYLOR, JR., *Primary Examiner.*

R. W. GRIFFIN, *Assistant Examiner.*

U.S. Cl. X.R.

117—124, 148, 155, 161, 167; 260—22, 23, 33.6, 39, 40, 41, 854, 855

Dedication 3,451,955. —*Jerry Norman Koral*, Stamford, and *John Christos Petropoulos*, Norwalk, Conn. COATING COMPOSITION COMPRISING A BLEND OF THE REACTION PRODUCT OF A HIGHLY METHYLATED HEXAMETHYLOL MELAMINE WITH A FREE HYDROXYL GROUP CONTAINING COPOLYMER BLENDED WITH A GLYCERIDE OIL MODIFIED ALKYD RESIN OR CERTAIN ACRYLIC TERPOLYMERS. Patent dated June 24, 1969. Dedication filed Mar. 4, 1983, by the assignee, *American Cyanamid Co.*

Hereby dedicates the remaining term of said patent to the Public.

[*Official Gazette May 31, 1983.*]